United States Patent [19]
Burnett et al.

[11] 3,811,503
[45] May 21, 1974

[54] SECONDARY RECOVERY USING MIXTURES OF CARBON DIOXIDE AND LIGHT HYDROCARBONS

[75] Inventors: David B. Burnett; Frank H. Lim, both of Houston, Tex.

[73] Assignee: Texaco Inc., New York, N.Y.

[22] Filed: July 27, 1972

[21] Appl. No.: 275,589

[52] U.S. Cl............... 166/252, 166/273, 166/274
[51] Int. Cl............................................. E21b 43/22
[58] Field of Search.................. 166/252, 273, 274

[56] References Cited
UNITED STATES PATENTS

| | | | |
|---|---|---|---|
| 2,623,596 | 12/1952 | Whorton et al. | 166/274 |
| 3,084,743 | 4/1963 | West et al. | 166/273 |
| 3,256,933 | 6/1966 | Murphree et al. | 166/273 X |
| 3,623,552 | 11/1971 | Vairogs | 166/274 |
| 3,262,498 | 7/1966 | Connally, Jr. et al. | 166/273 |
| 3,687,198 | 8/1972 | Hearn et al. | 166/274 |
| 3,620,304 | 11/1971 | Hearn et al. | 166/274 |
| 3,661,208 | 5/1972 | Scott et al. | 166/274 |
| 3,249,157 | 5/1966 | Brigham et al. | 166/273 |
| 2,875,830 | 3/1959 | Martin | 166/273 X |

*Primary Examiner*—Stephen J. Novosad
*Attorney, Agent, or Firm*—T. H. Whaley; C. G. Reis

[57] ABSTRACT

Recovery of oil from an oil-bearing reservoir is effected by the injection of a mixture of carbon dioxide and light hydrocarbons in a critical ration whereby there is formed a miscible transition zone between the mixture and the reservoir oil.

9 Claims, 1 Drawing Figure

HYPOTHETICAL CARBON DIOXIDE-HYDROCARBON SYSTEM
AT PRESSURE P AND TEMPERATURE T

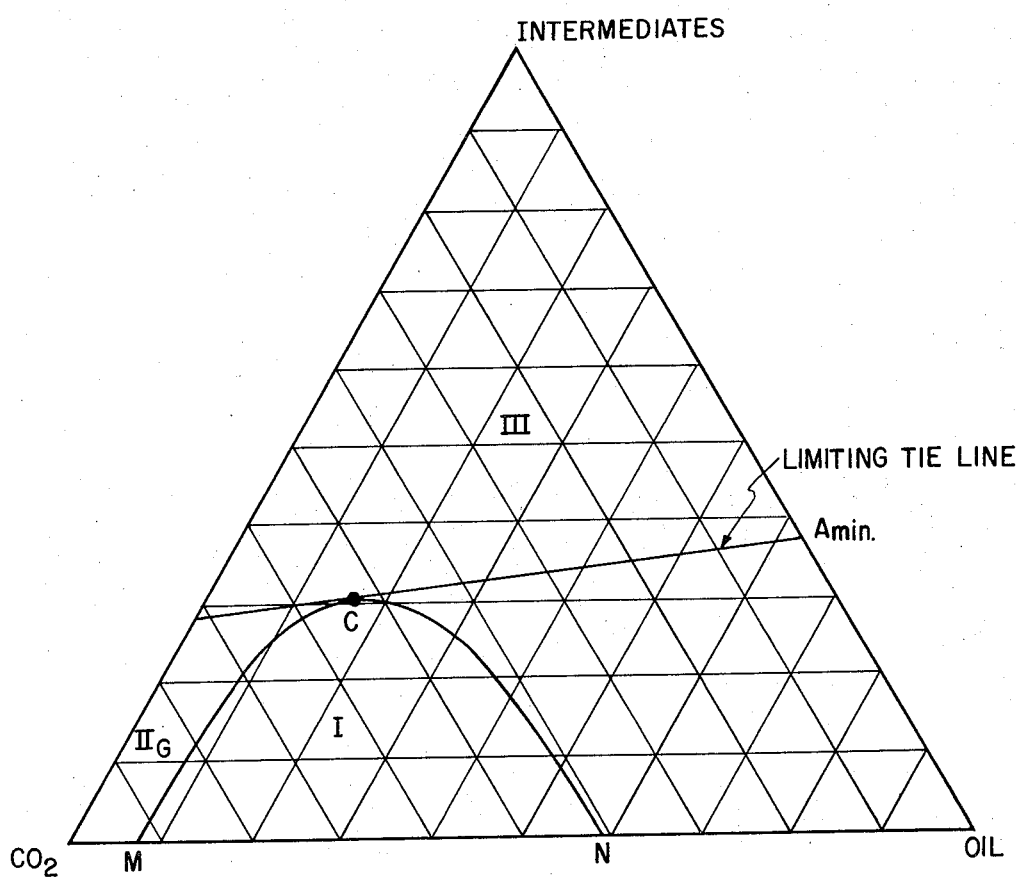
HYPOTHETICAL CARBON DIOXIDE-HYDROCARBON SYSTEM AT PRESSURE P AND TEMPERATURE T

SECONDARY RECOVERY USING MIXTURES OF CARBON DIOXIDE AND LIGHT HYDROCARBONS

FIELD OF THE INVENTION

This invention relates to the recovery of oil from a subterranean hydrocarbon-bearing reservoir by the injection thereinto of a slug of a mixture of carbon dioxide and light hydrocarbons in a critical ratio, which slug forms a miscible transition zone with the reservoir oil and thereafter injecting a driving agent to displace the slug and reservoir oil thru the reservoir to a production well.

DESCRIPTION OF THE PRIOR ART

In the recovery of oil from an underground reservoir one method that has been suggested for improving oil recovery is that of miscible flooding wherein a solvent is injected into the reservoir to push and wash out the oil of the reservoir. When solvents are employed which can mix completely with the oil, the term "miscible flooding" is applied to the process.

The process of miscible flooding is extremely effective in stripping and displacing the reservoir oil from the reservoir thru which the solvent flows. This effectiveness is derived from the fact that a two-phase system within the reservoir and between the solvent and the reservoir oil is eliminated at the conditions of temperature and pressure of the reservoir, thereby eliminating the retentive forces of capillarity and interfacial tension which are significant factors in reducing the recovery efficiency of oil in conventional flooding operations where the displacing agent and the reservoir oil exist as two phases in the reservoir.

Miscible recoveries of oil are normally accomplished by displacement techniques whereby a fluid that is miscible with the reservoir oil is injected into a reservoir which serves to displace the oil thru the reservoir and toward a production well from which the oil is produced. Normally, the fluids used are light hydrocarbons and mixtures thereof, such as paraffins in the $C_2$ to $C_6$ range and, in particular, liquid petroleum gas or LPG.

Carbon dioxide has been used as an oil recovery agent wherein recovery is improved by taking advantage of the solubility of the carbon dioxide in the oil, causing viscosity reduction and swelling of the oil, thereby leading to increased recovery. However, in this use, carbon dioxide is not a miscible type displacing agent since the pressures have been much lower than the miscibility pressures for carbon dioxide and oil. Generally, the miscibility pressure for the carbon dioxide/oil system is greater than about 5,000 psia.

It is an object of the present invention to better utilize carbon dioxide as a recovery agent by means of a conditional miscible flood process.

It is a further object of this invention to utilize a light hydrocarbon with the carbon dioxide so as to decrease minimum miscibility pressure requirements while retaining the benefits of miscibility, thereby enhancing the economics of the miscible flood.

It is yet a further object of this invention to provide a technique for determining the critical ratio of carbon dioxide to the light hydrocarbon to achieve miscibility with the reservoir oil.

SUMMARY OF THE INVENTION

This invention relates to the recovery of oil from an oil-bearing reservoir wherein a slug of a mixture of carbon dioxide and a light hydrocarbon, such as liquid petroleum gas in a critical ratio is injected into the reservoir in an amount sufficient to form a conditional miscible transition zone with the reservoir oil at the reservoir conditions of pressure and temperature, and thereafter injecting a driving agent to displace the reservoir oil toward a production well from which the oil is produced.

BRIEF DESCRIPTION OF THE FIGURE

The FIGURE illustrates a 3-component composition diagram for a carbon dioxide-hydrocarbon system.

DESCRIPTION OF THE INVENTION

In its broadest aspect the invention comprises introducing into the oil-bearing reservoir a slug of a mixture of carbon dioxide and a light hydrocarbon that is capable of forming a miscible transition zone with the reservoir oil, and thereafter injecting a driving fluid to displace the oil thru the reservoir to a production well from which it is produced.

The invention resides in the fact that the reservoir is flooded under conditions at which conditional miscibility exists between the slug mixture and the reservoir oil. It is applicable, but not restricted to, reservoirs which are too low in pressure to allow carbon dioxide alone to be conditionally miscible with the oil. It is within the scope of the invention to provide a means for determining the critical ratio of the carbon dioxide to the light hydrocarbon.

Conditional miscibility within the meaning of this invention is to be distinguished from instant miscibility by the fact that miscibility in a conditional miscibility sense is achieved by a series of transition multiphase conditions wherein the injected mixture is stripped of intermediate components by the oil until a miscible transition zone is created in situ by an enriching gas drive.

According to the invention, such conditional miscibility may be achieved by the use of carbon dioxide containing a light hydrocarbon. The ratio of hydrocarbon to the carbon dioxide at which conditional miscibility may be attained for a particular reservoir crude and at particular reservoir conditions, is termed the critical ratio. At this ratio the mixture contains the minimum concentration of light hydrocarbon that can be present for the practice of this invention, i.e., to have conditions of conditional miscibility.

The critical ratio for the condition relating to an enriching gas drive as herein defined can be determined by means of slim tube displacement tests, which tests are commonly used to establish conditions simulating an enriched gas drive using hydrocarbon systems. An enriched gas drive is defined as one in which absorption of the components of the slug solvent by the reservoir oil occurs.

A further insight into the invention can be obtained by referring to the accompanying FIGURE. A hypothetical carbon dioxide, intermediates, oil system may be considered on a pseudo 3-component system as shown at a given pressure and temperature. The vertices of the triangle are represented by $CO_2$, hydrocarbon intermediates ($C_2$–$C_4$) and oil. The curve M, C, N represents the phase envelope and the area under the phase envelope, I, is a two-phase region in which a liquid and a gas phase exist. The area above the phase envelope, III, represents a single phase condition which is liquid. The area to the left of the phase envelope, $II_G$, represents a single phase condition which is gaseous. The reservoir oil is represented by R. The tie line which is shown tangent to the phase envelope and thru the critical point, C, represents the limiting tie line for miscible conditions. At the conditions of temperature and pressure for this system, there will be some minimum solvent composition, $S_{min}$, above which a miscible drive occurs.

Solvents containing equal or greater amounts of intermediates than solvent $S_{min}$ will be conditionally miscible with oil R.

The light hydrocarbon may be any light hydrocarbon, such as ethane, propane, liquefied petroleum gas, butane or mixtures thereof. The minimum concentration of light hydrocarbon that can be present with the carbon dioxide and yet have conditional miscibility may be determined by the slim tube displacement tests. By means of these tests, percent recovery of the in-place fluid is determined at solvent breakthrough for a given composition of solvent mixture by varying the composition at the pressure of the reservoir. A breakpoint is determined in a curve of percent recovery vs. composition. This breakpoint is indicative of the inception of conditional miscible-type behavior.

In conducting slim tube tests, a 40-foot long tube is filled with sand which is then saturated with the oil of interest. A displacing fluid, having a composition containing carbon dioxide and light hydrocarbon, is injected at a given rate, and thereafter displacement of the oil is monitored by means of observing the effluent from the tube. Observation of the first appearance of a gas phase is noted in a high pressure sight glass and recovery is determined at the point in time of this appearance of two phases.

In a series of tests using a given reservoir oil, displacement studies were conducted at a pressure of 1,250 psi and a temperature of 130° F. Under these conditions, and for this particular oil, conditional miscibility was obtained for a slug of 100% carbon dioxide, and the percent recovery was approximately 80%. In a second series of tests in which the displacing slug was a mixture of 10% of $C_2$–$C_4$ and 90% $CO_2$ the recovery was 96%.

In practice of the invention, the proper solvent composition is selected as one that contains sufficient light hydrocarbon, e.g., liquefied petroleum gas, to allow a conditionally miscible enriched gas drive to occur. The proper solvent composition for the particular reservoir is chosen from slim tube displacement tests as herein described. Generally, the solvent LPG requirements decrease with decreasing reservoir temperatures or increasing reservoir pressures.

After having established a slug of a mixture of carbon dioxide and a light hydrocarbon, and the transition zone between the reservoir oil and the slug, a driving fluid is then injected to drive the slug, the transition zone and the reservoir oil thru the reservoir towards a production well from which the oil can be produced. The driving fluid may be any relatively inexpensive fluid, including gas such as air, nitrogen, combustion or flue gas, separator gas, natural gas or mixtures thereof. The drive fluid may also be water or brine and may contain additives such as a surfactant, to maintain efficient displacement by the driving fluid.

The driving agent is injected in amounts sufficient to displace the solvent thru the reservoir and is injected at a rate so that the preferred rate of movement thru the reservoir is from about 0.03 to about 10.0 feet per day.

It is within the scope of the invention to apply the process either as a horizontal displacement technique wherein the slug is established to form a circumferential ring expanding from the injection well as the process is continued, or it can be used in a vertical displacement wherein a blanket or layer is established prior to the injection of the driving fluid and which moves the blanket vertically thru the reservoir.

In summary, in accordance with the practice of this invention, a conditional miscible flood is carried out in the following manner. There is introduced into the reservoir a slug of a mixture of carbon dioxide and a light hydrocarbon that is capable of forming with the reservoir, at the temperature and pressure thereof, a zone of conditional miscibility. The composition of the mixture, or the critical ratio of the components may be determined by means of slim tube displacement tests. After an amount sufficient to establish a slug has been injected, there is introduced into the formation a driving fluid such as gas or water. The injection of the driving fluid is continued so as to move the fluids of the reservoir thru the reservoir toward a production well from which the reservoir oil and the solvent can be produced. By operating in the above-indicated manner, a substantially complete displacement of the reservoir oil is realized.

We claim:

1. A process for recovering oil from an oil-bearing reservoir traversed by at least one injection well and one production well, comprising the steps of:
    a. determining the critical ratio of light hydrocarbon to carbon dioxide to achieve conditional miscibility of said light hydrocarbon and carbon dioxide with the reservoir oil at the pressure and temperature of said reservoir, said light hydrocarbon having from two to four carbon atoms per molecule,
    b. injecting into said reservoir via said injection well a slug comprising said light hydrocarbon and said carbon dioxide in said critical ratio, said slug being injected in amounts sufficient to establish a transition zone of said slug with said reservoir oil,
    c. injecting into said reservoir a driving agent and driving said slug and said oil through said reservoir to said production well,
    d. producing said oil via said production well.

2. The process of claim 1 wherein said light hydrocarbon is selected from the group consisting of ethane, propane, liquefied petroleum gas, butane and mixtures thereof.

3. The process of claim 2 wherein said light hydrocarbon is LPG.

4. The process of claim 1 wherein said driving agent is selected from the group consisting of air, nitrogen, combustion gas, separator gas, natural gas, methane, water and mixtures thereof.

5. A process for recovering oil from an oil-bearing reservoir traversed by at least one injection well and one production well comprising the steps of:
    a. injecting into said reservoir via said injection well a slug comprising carbon dioxide and a hydrocarbon, said hydrocarbon having from two to four carbon atoms per molecule, said slug being capable of forming a conditionally miscible transition zone with said oil at the pressure and temperature of said reservoir, said slug being injected in amounts sufficient to establish said transition zone, b. injecting into said reservoir via said injection well a driving agent and driving said slug and said oil through said reservoir towards said production well, c. producing said oil via said production well.

6. The process of claim 5 wherein step (a) is preceded by injection of a fluid to repressure said reservoir to the minimum conditional miscibility pressure at which said slug is miscible with said oil.

7. The process of claim 6 wherein said repressuring fluid is selected from the group consisting of air, nitrogen, combustion gas, natural gas, methane, water and mixtures thereof.

8. The process of claim 5 wherein said driving agent is selected from the group consisting of air, nitrogen, combustion gas, separator gas, natural gas, methane, water and mixtures thereof.

9. The process of claim 5 wherein said light hydrocarbon is selected from the group consisting of ethane, propane, liquefied petroleum gas, butane and mixtures thereof.

* * * * *